(12) United States Patent
Kuismanen

(10) Patent No.: US 10,189,183 B2
(45) Date of Patent: Jan. 29, 2019

(54) METHOD AND APPARATUS ARRANGEMENT FOR MIXING SILICONE COMPOSITION

(71) Applicant: Oy Pro-Hydro Ab, Tornio (FI)

(72) Inventor: Esa Kuismanen, Tornio (FI)

(73) Assignee: Oy Pro-Hydro Ab, Tornio (FI)

(*) Notice: Subject to any disclaimer, the term of this patent is extended or adjusted under 35 U.S.C. 154(b) by 31 days.

(21) Appl. No.: 15/542,776

(22) PCT Filed: Jan. 7, 2016

(86) PCT No.: PCT/FI2016/050004
§ 371 (c)(1),
(2) Date: Jul. 11, 2017

(87) PCT Pub. No.: WO2016/113464
PCT Pub. Date: Jul. 21, 2016

(65) Prior Publication Data
US 2018/0021982 A1    Jan. 25, 2018

(30) Foreign Application Priority Data
Jan. 13, 2015  (FI) .................................. 20155022

(51) Int. Cl.
*B29B 7/00* (2006.01)
*B29B 7/82* (2006.01)
(Continued)

(52) U.S. Cl.
CPC ............... *B29B 7/82* (2013.01); *B29B 7/005* (2013.01); *B29B 7/244* (2013.01); *B29B 7/286* (2013.01);
(Continued)

(58) Field of Classification Search
None
See application file for complete search history.

(56) References Cited

U.S. PATENT DOCUMENTS 5,198,171 A * 3/1993 Kasahara ............ B01F 13/1027
264/142
5,777,002 A    7/1998 Conway et al.
(Continued)

FOREIGN PATENT DOCUMENTS

EP    0328118 A1    8/1989
EP    0739652 A1    10/1996
(Continued)

OTHER PUBLICATIONS

Finnish Patent Office, Search Report, FI20155022, dated Sep. 10, 2015.

*Primary Examiner* — Robert S Loewe
(74) *Attorney, Agent, or Firm* — Berggren LLP

(57) ABSTRACT

In the manufacturing method and manufacturing arrangement according to the invention for a silicone composition the mixer mixing the different subcomponents of the silicone composition are removed for the duration of downtime and cooled to a temperature, in which the chemical reaction between the different subcomponents of the silicone composition stops. In the manufacturing method of the invention the mixer is reconnected to the manufacturing apparatus arrangement after downtime without cleaning it from the silicone composition subcomponents remaining in the mixer.

12 Claims, 3 Drawing Sheets

State of the art

(51) Int. Cl.
  *B29B 7/24* (2006.01)
  *B29B 7/28* (2006.01)
  *B29B 7/80* (2006.01)
  *C08J 3/00* (2006.01)
  *C08J 3/24* (2006.01)
  *B29K 83/00* (2006.01)

(52) U.S. Cl.
  CPC .............. *B29B 7/805* (2013.01); *C08J 3/005* (2013.01); *C08J 3/24* (2013.01); *B29K 2083/00* (2013.01); *C08J 2383/04* (2013.01)

(56) References Cited

U.S. PATENT DOCUMENTS

| | | | |
|---|---|---|---|
| 6,001,917 A * | 12/1999 | Takahashi | C08K 3/36 523/346 |
| 6,177,506 B1 * | 1/2001 | Takahashi | C08K 3/36 264/210.6 |
| 6,414,054 B1 * | 7/2002 | Boffard | B01F 7/04 523/322 |
| 2006/0247406 A1 | 11/2006 | Reitmeier et al. | |
| 2007/0282036 A1 | 12/2007 | Ulzheimer | |

FOREIGN PATENT DOCUMENTS

| | | |
|---|---|---|
| EP | 1006138 A1 | 6/2000 |
| EP | 1184071 A1 | 3/2002 |
| JP | 3604181 B2 | 12/2004 |
| WO | 2005077509 A1 | 8/2005 |

\* cited by examiner

FIG. 1 State of the art

METHOD AND APPARATUS ARRANGEMENT FOR MIXING SILICONE COMPOSITION

PRIORITY

This application is a U.S. national application of the international application number PCT/FI2016/050004 filed on Jan. 7, 2016 and claiming priority of Finnish national application FI20155022 filed on Jan. 13, 2015, the contents of all of which are incorporated herein by reference.

The invention relates to a method and apparatus arrangement, with which the efficiency and occupational safety of the manufacturing arrangement for silicone can be improved and the environmental nuisances relating to the manufacture can be reduced.

STATE OF THE ART

Silicones i.e. polysiloxanes are silicon-oxygen-polymers, the chemical formula of which is $[R_2SiO]_n$, where R is an organic group, for example methyl, ethyl or phenyl. Silicone materials consist of an inorganic silicon-oxygen backbone chain, in which organic pendant groups are attached to silicone atoms. Different silicones can be synthetized by changing the length of the Si—O chains and pendant groups so that they are provided with different characteristics as the compositions vary. The most common silicone type is PDMS i.e. linear polydimethylsiloxane.

Silicone oils, polymers and sealing compounds are odourless and colourless, waterproof, resistant to chemicals and oxidation, and stable in high temperatures. They have a low melting point and they do not conduct electricity. They are used as substitutes for organic polymers in high temperatures.

Special requirements are set for products to be used in demanding environmental circumstances. For example, different submarine cables and pipelines have to be maintenance-free. In these applications special requirements set for the resistance of heat, chemicals and pressure can be met by silicon-based products. In the silicones used for these products, in addition to the basic silicone material, one or several special additional components or hardeners are utilised in their manufacture.

FIG. 1 presents a state-of-the-art silicone manufacturing apparatus arrangement 100, with which silicone material fulfilling the mechanical, chemical and/or electrical requirements required in the application 40. The silicone composition is mixed of two or several original materials in a mixer 30 in accordance with the requirements of the application 40. The basic material for the silicone composition used is in the material container 1, reference 10. Due to the properties of the silicone composition to be manufactured other material components from at least one second material container 2, reference 11, are mixed with the silicone basic composition. In the example in FIG. 1, the number of different material containers for additional substances is N, reference 12. Different material components to be added in the silicone are, for example, hardeners and different filling agents.

Each material container 10-12 is connected to its own pump with an input pipe. In the example in FIG. 1, the material container 10 is connected to the pump 1, reference 20, with the pump's input pipe 10a. Respectively, the material container 11 is connected to the pump 2, reference 21, with the pump's input pipe 11a, and the material container 12 is connected to the pump N, reference 22, with the pump's input pipe 12a. The operating principle of the pumps 20-22 can be selected in accordance with the requirements set by the silicone composition to be manufactured and/or application. The operation of the pumps 20-22 is controlled so that the basic component for the silicone composition from the material container 10 and the additional components from the material containers 11-12 are fed to the mixer 30 in a mixture ratio determined by the silicone composition going to the application 40.

Each pump 20-22 is connected to the mixer 30 with their own discharge pipes 20a, 21a and 22a. The operating principle of the mixer can be selected according to the silicone material to be manufactured and/or application 40. The mixer 30 can be, for example, a reverse-threaded spiral mixer. The manufactured, yet unvulcanised silicone composition is guided from the mixer 30 to the application 40 via the pipe 30a.

In the application 40 the silicone composition mixed with the mixer 30 is processed into its final form by vulcanization with the impact of time and heat.

When the manufacture of the silicone composition has to be interrupted for one reason or another, and if the downtime lasts too long, the silicone composition in the mixer 30 has time to vulcanize inside the mixer 30 into the final silicone compound according to the application 40.

To prevent the vulcanization of the material in the mixer 30, the mixer 30 has to be cleaned if downtime in the use is assumed to be so long that the vulcanization process starts in the mixer 30. In this case strong solvents have to be used in the cleaning of the mixer 30. Some examples of cleaning chemicals used are xylene and acetone. Both solvents contain substances hazardous for health and/or nature. Because of this the cleaning operation of the mixer 30 has to be carried out carefully, when it takes time, which again raises the total manufacturing costs of the silicone composition.

As a consequence of the cleaning operation, the silicone composition present at the beginning of cleaning is lost from the mixer 30. In addition, also the silicone material used in the start-up of the process required by the restart is lost.

The publication EP 1184071 describes a manufacturing apparatus for a silicone composition, the parts of which can be removed between times of use. With this procedure it is possible to avoid the problems caused by parts of the manufacturing apparatus vulcanized either partly or entirely.

The publication EP 1006138 describes a self-cleaning mixer for a silicone composition. In the cleaning process the temperature of a metal mixer is raised to approximately 200° C., when the activity of the most common catalysts ends. Nevertheless, the procedure requires such a high temperature that the cleaning method is not applicable to such parts of the manufacturing apparatus, which are not resistant to high temperature.

OBJECT OF THE INVENTION

It is an object of the invention to introduce a new mixing method and manufacturing arrangement for a silicone composition, with which it is possible to avoid the cleaning problems of the mixer arising in connection with shutdowns.

In the manufacturing method and manufacturing arrangement for silicone according to the invention, cleaning of the mixer usually performed as a consequence of shutdown is not needed during the downtime. In the method of use of the mixer of the invention the cleaning of the silicone composition mixer is avoided by cooling the silicone mixing unit with the silicone compositions in the mixer for the duration of downtime. Cooling is achieved by installing an appropriate cooling element around the mixer and its output hoses or by detaching the silicone composition mixer from the other manufacturing apparatus and by placing it advantageously to a separate cooling apparatus in a different location.

It is an advantage of the invention that the mixer used in the mixing of silicone does not need to be cleaned using chemicals dangerous for humans and/or environment.

It is further an advantage of the invention that the shutdown and start-up times required by the downtime of the silicone composition mixer will be shortened radically, due to which the manufacturing costs become lower.

It is further an advantage of the invention that no silicone composition present in the mixer during shutdown and start-up is lost in connection with the downtime of the silicone composition mixer. Also this reduces manufacturing costs.

It is further an advantage of the invention that advantageously a refrigerator or freezer can be used as cooling apparatus.

It is further an advantage of the invention that no other mechanical modifications need to be made to the manufacturing apparatus for silicone composition according to the state of the art, but installing the cooling unit of the invention around the mixer and its discharge pipe for the duration of downtime or converting the input and output connections of the mixer to quick fasteners so that the mixer can be easily removed from and attached to the manufacturing arrangement for a silicone composition because of downtime.

It is characteristic of the method of the invention for manufacturing a silicone composition that in the method
- a silicone composition mixer is cooled to a temperature, in which a chemical reaction between different subcomponents of a silicone composition stops
- keep the silicone composition mixer in a cooling temperature for a duration of downtime, and that
- the manufacture of silicone composition continues after downtime without cleaning the mixer.

It is characteristic of the manufacturing arrangement for a silicone composition of the present invention that, for a duration of downtime, a silicone composition mixer belonging to the manufacturing arrangement for a silicone composition is arranged to be cooled to a temperature, in which a chemical reaction between different subcomponents of the silicone composition in the mixer stops and that the manufacture of the silicone composition is configured to continue without cleaning the mixer after downtime.

Some advantageous embodiments of the invention are disclosed in the dependent patent claims.

The basic idea of the invention is as follows: In the method for manufacturing/mixing silicone the silicone composition mixer and its discharge pipeline can advantageously be either closed inside a cooling unit at the beginning of downtime or detached from between the pumps or input pipe leading to the application. If the mixing unit is removed, it can be placed to a separate cooled space or apparatus for the duration of downtime after removing.

The temperature of the cooled space used in the cooling of the mixer is advantageously −10° C. or colder. At the temperature of the cooled storing space the chemical reaction between the different subcomponents of silicone in the mixer slows down or stops practically entirely as a consequence of the drop in temperature. Due to this the vulcanization of the silicone composition subcomponents to silicone stops in the mixer.

When the downtime in the manufacture of silicone composition ends, the cooling apparatus around the mixer is opened or the cooling liquid circulation of the cooling apparatus is closed. In an advantageous embodiment of the invention the cooled mixer is taken from a separate cooled space of the invention and connected between the pumps and the feed line leading to the application. The start-up of the process can be started immediately after the end of the cooling process. Because there was no vulcanization process going on in the mixer during downtime, also the mix of silicone composition components in the mixer can be utilized in the final application.

The invention is next explained in detail. In the explanation reference is made to the attached drawings, in which FIG. 1 illustrates in an exemplary manner a state-of-the art manufacturing arrangement for a silicone composition;

FIG. 2 illustrates in an exemplary manner a manufacturing arrangement for silicone composition of the invention; and FIG. 3 illustrates in an exemplary manner some functional main steps utilized in the manufacture of a silicone composition of the invention.

The embodiments in the following description are merely exemplary, and one skilled in the art can execute the basic idea of the invention also in some other way than the one described in the description. Although reference can be made to a certain embodiment or embodiments in several places in the description, this does not mean that the reference would only be directed to one described embodiment or that the described feature would be feasible in only one described embodiment. Individual features of two or several embodiments can be combined and thus achieve new embodiments of the invention.

Figure 1:
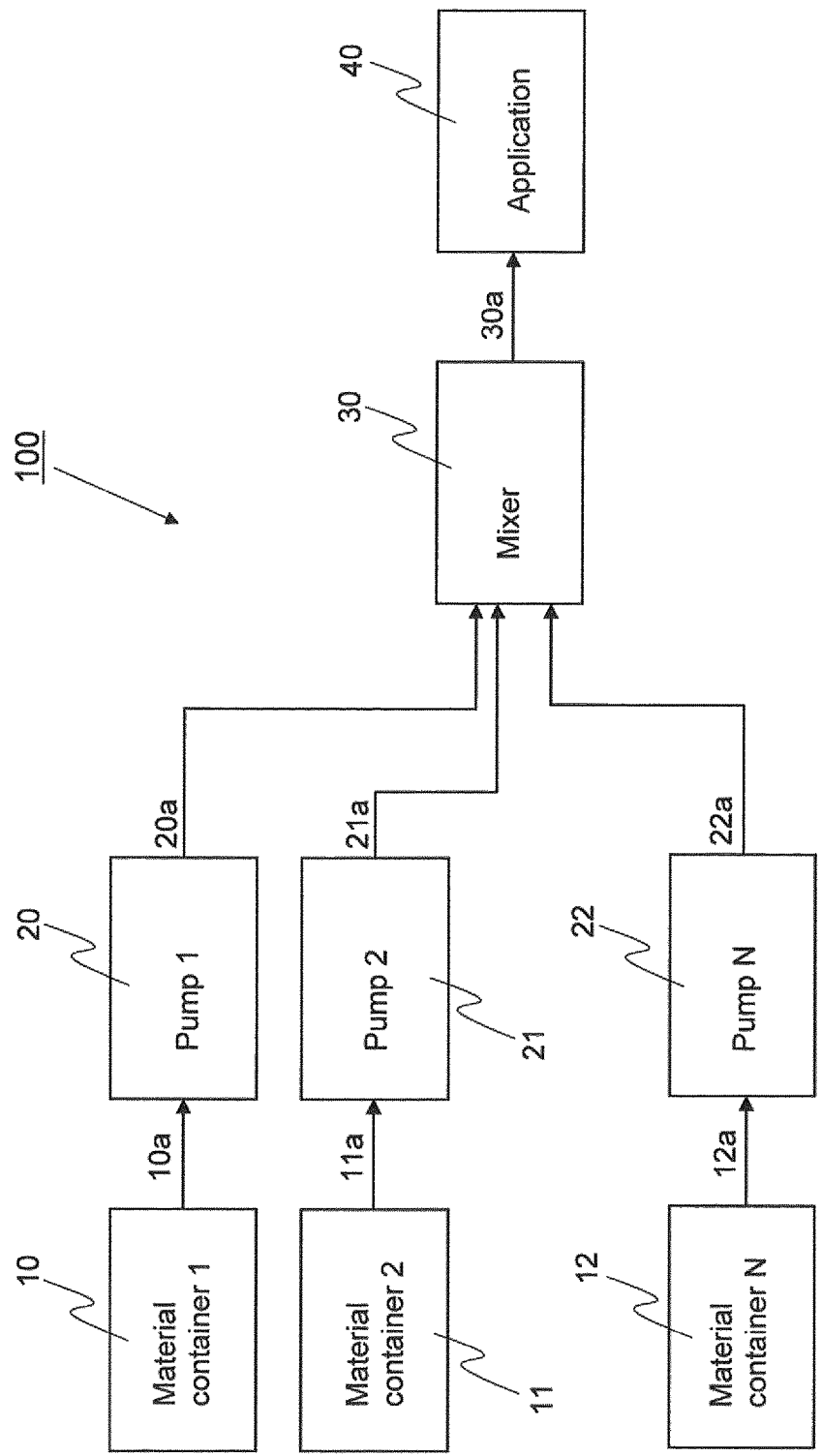
FIG. 1 is presented in connection with the description of the state of the art.

The silicone composition is mixed of two or several silicone composition subcomponents in the mixer 30 in accordance with the requirements for the application 40.

The main component of the silicone composition used is in the material container 1, reference 10. Because of the properties of the silicone composition to be manufactured, other subcomponents are mixed with the main component of silicone from at least one other material container 2, reference 11. Subcomponents can comprise, for example, a hardener and different filling agents.

Figure 2:
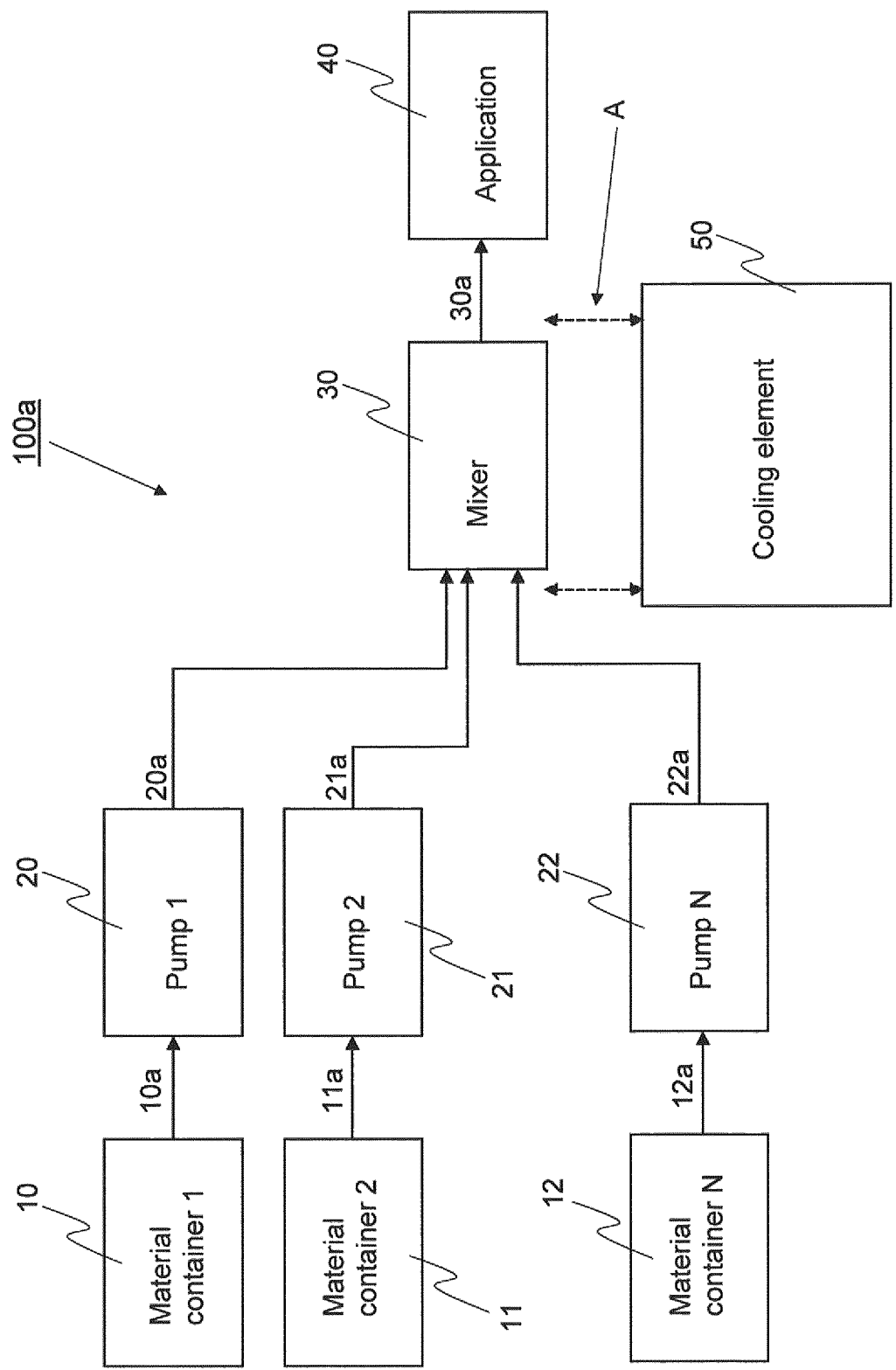
FIG. 2 illustrates a manufacturing arrangement 100*a* for a silicone composition of the invention, the basic structure of the arrangement corresponding to the state-of-the art manufacturing apparatus arrangement 100 for a silicone composition illustrated in FIG. 1.

Each material container 10-12 for silicone composition subcomponents is connected to an own pump with an input pipe. In the example of FIG. 2, the material container 10 is connected to the pump 1 with the input pipe 10*a* of the pump in question, reference 20. Respectively, the material container 11 is connected to the pump 2, reference 21, with the input pipe 11*a* and the material container 12 is connected to the pump N with the input pipe 12*a* of the pump in question, reference 22. The operation of the pumps 20-22 is controlled so that basic material from the container 10 and additional components from the containers 11-12 are fed to the mixer 30 in the mixing proportion defined by the silicone composition required by the application 40.

An input pipe 20*a*, 21*a* and 22*a* is connected from each pump 20-22 to the access of the mixer 30. The operating principle of the mixer 30 can be selected according to the silicone material to be manufactured and/or the application 40. For example, the mixer 30 can be a reverse-threaded spiral mixer. The yet unvulcanized silicone composition prepared in the mixer 30 is directed to the application 40 through the discharge pipe 30a.

In the manufacturing apparatus arrangement 100a for a silicone composition according to the invention the input connections of the mixer unit 30 to the output pipes 20a-22a of the pumps 20-22 and the output connection of the mixer 30 to the discharge pipe 30a have advantageously been executed as quick fasteners.

In an advantageous embodiment of the invention the cooler element 50 is a separate cooling device, which can be installed around the mixer 30 and the discharge pipe 30a leading from the mixer to the application 40 during downtime.

In an advantageous embodiment of the invention the mixer 30 and its discharge pipe 30a are fixedly inside the cooling element 50. In this embodiment the cooling element is only started for the duration of downtime. When downtime ends, the cooling element is closed and the manufacturing process can continue.

In an advantageous embodiment of the invention the mixer 30 is removed from the other apparatus components of the manufacturing apparatus arrangement for the duration of downtime by using the quick fastener solutions mentioned above. The removed mixer 30 can then be advantageously moved (reference A) inside the separate cooling element 50 for the duration of downtime.

When the downtime is over, the mixer 30 under cooling is taken out from the cooling element 50 and placed back between the pumps 20a-22a of the manufacturing apparatus arrangement 100a and the application 40 by using the quick fasteners.

For example, a conventional freezer or refrigerator can advantageously be utilized as the separate cooling element 50. The cooling temperature is chosen on the basis of the vulcanization properties of the silicone composition to be manufactured.

An inner temperature as high as +3° C. of the refrigerator already slows down the vulcanization speed of the silicone composition in the mixer 30 so much that the mixer 30 need not be cleaned because of short interruptions in use (for example downtime lasting overnight).

The inner temperature of the cooling element 50 is advantageously at least −10° C. In this temperature the material mixture in the mixer 30 remains unvulcanised for several days. If the inner temperature of the cooling element is around −30° C., the material mixture in the mixer stays usable for months.

When the cooled mixer 30 is allowed to warm after downtime either by stopping the use of the cooling element or by fastening it back to the other manufacturing apparatus arrangement 100a for the silicone composition, the transfer of the silicone composition from the mixer 30 to the application 40 through the discharge pipe 30a can be started immediately. The time-consuming process start-up becomes significantly shorter compared to the state-of-the art procedure, in which the mixer 30 cleaned with a solvent because of each downtime has to be started up with a clean silicone composition. In several cases the silicone composition used for start-up is not suitable for use in the actual application 40.

Figure 3:
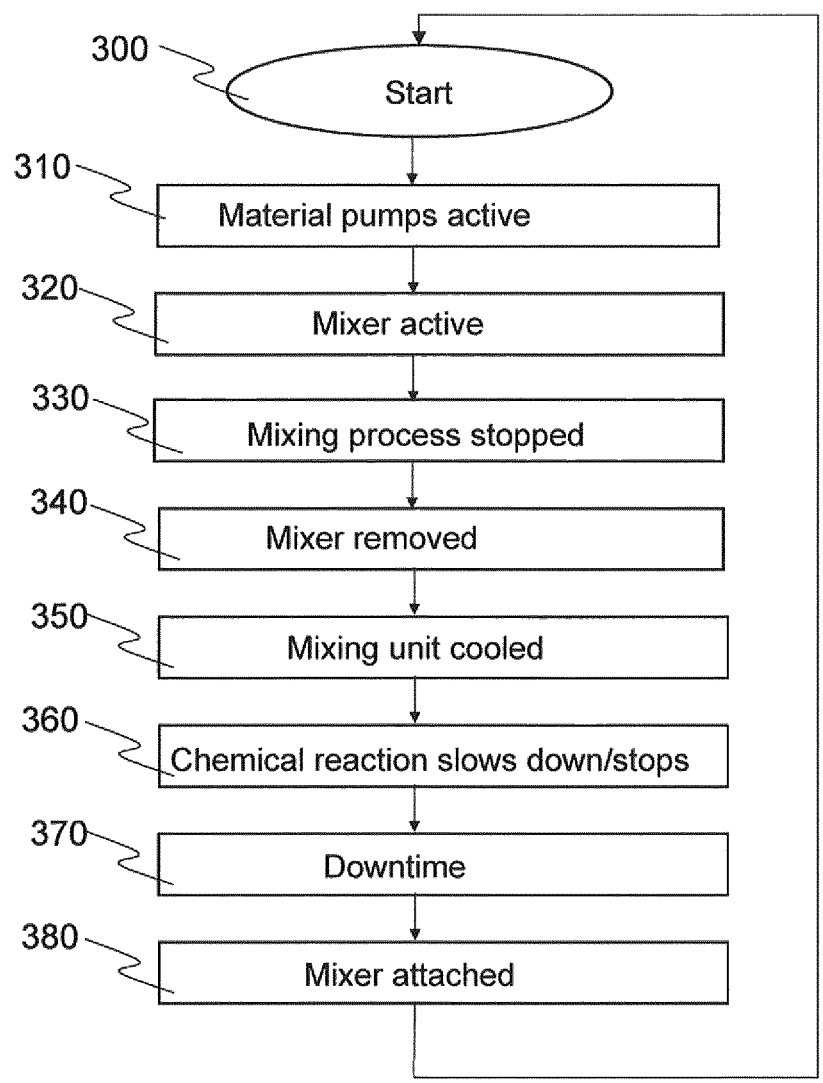

FIG. 3 shows an exemplary flowchart of the main steps of the method of the invention for manufacturing a silicone composition.

The pumps 20-22 are started in step 300, and the manufacture of the silicone composition begins. The start of the manufacturing process can be done either by using a cleaned manufacturing apparatus or the manufacturing apparatus arrangement 100a for silicone composition can be started after downtime in a state in which the silicone composition subcomponents remaining in the mixer 30 before downtime are still in the mixer 30.

In step 310 the pumps 20-22 of the manufacturing apparatus arrangement 100a for silicone composition pump different silicone composition subcomponents to the input connectors of the mixer 30, each with an own discharge pipe 20a, 21a, 22a.

The pumps 20-22 drain the silicone composition subcomponents from the material containers 10-12 through the pump-specific input pipes 10a-12a.

In step 320 the silicone material mixer 30 is in operation. The mixer 30 can be, for example, a static or dynamic mixer. In an advantageous embodiment of the invention the silicone composition subcomponents to be mixed are mixed in the mixer 30 advantageously by the influence of the feed pressure generated to the mixer 30 by the pumps 20-22. The mixer 30 can be, for example, a reverse-threaded spiral mixer. It is obvious for one skilled in the art that also other kinds of mixing techniques can be utilized in the mixer 30.

The manufacturing process for a silicone composition is interrupted in step 330.

If the downtime is expected to be so long that the silicone composition mixture in the mixer 30 is estimated to become at least partly vulcanized, the mixer 30 and the discharge pipe 30a extending from it are in this case either closed inside the cooling element 50 in accordance with the invention or they are removed and transferred (reference A) inside the separate cooling element 50 in step 340. A conventional freezer or refrigerator can advantageously be utilized as the cooling element 50.

In step 350 the temperature of the silicone composition in the mixer 30 can be lowered in the cooling element 50 so low that the vulcanization of the silicone composition slows down considerably or stops.

In step 360 the temperature inside the cooling element 50 is advantageously +3° C.--30° C. The colder the mixer 30 is to be cooled, the longer the mixture of silicone composition subcomponents in the mixer 30 remains usable (unvulcanised), because the chemical reaction between the different subcomponents of the silicone composition slows down or ends.

Step 370 illustrates the downtime in the manufacture of a silicone composition. Its duration can be from hours to months.

When the downtime ends, the cooling liquid circulation of the cooling element 50 is closed or the cooled mixer 30 is taken out from the cooling element 50 and reattached to the manufacturing apparatus arrangement 100a for a silicone composition, when needed.

After the cooling of the mixer 30 has ended or after it has been reattached to the manufacturing apparatus arrangement 100a for a silicone composition, the process for manufacturing a silicone composition can be restarted in the starting step 300.

In the process of the invention for manufacturing a silicone composition the mixer 30 need not be cleaned from silicone composition subcomponents because of downtime. In addition, loss of silicone composition subcomponents causing costs can be avoided, which would arise if it were necessary to start up the mixer after its cleaning operation.

Some advantageous embodiments for a manufacturing method and manufacturing apparatus arrangement for a silicone composition have been described above. The invention is not limited to the solutions described, but the inventional idea can be applied in several ways within the limits set by the patent claims.

The invention claimed is:

1. A method for manufacturing a silicone composition, in which method
   a pumping of different silicone composition subcomponents is started;
   the silicone composition subcomponents are pumped with component-specific pumps to a mixer of silicone composition subcomponents;
   a silicone composition is mixed from the subcomponents with the mixer;
   the process for manufacturing silicone composition is stopped due to downtime;
   wherein
   the silicone composition mixer is cooled to a temperature, in which a chemical reaction between the different subcomponents of the silicone composition stops;
   the silicone composition mixer is kept at the cooling temperature for a duration of the downtime; and that
   the manufacture of the silicone composition is continued after the downtime without cleaning the mixer.

2. The method for manufacturing a silicone composition according to claim 1, wherein
   the silicone composition mixer is removed from manufacturing apparatus arrangement for a silicone composition for the duration of the downtime; and
   the silicone composition mixer is reconnected to the manufacturing apparatus arrangement for a silicone composition after the end of the downtime.

3. The method for manufacturing a silicone composition according to claim 2, wherein the silicone composition mixer is cooled in a separate cooling element.

4. The method for manufacturing a silicone composition according to claim 2, wherein the silicone composition mixer is cooled in a freezer.

5. The method for manufacturing a silicone composition according to claim 4, wherein the silicone composition mixer is cooled at least to a temperature of −10° C.

6. The method for manufacturing a silicone composition according to claim 2, wherein the silicone composition mixer is cooled in a refrigerator.

7. The method for manufacturing a silicone composition according to claim 6, wherein the silicone composition mixer is cooled to a temperature of +3° C.

8. A manufacturing arrangement for a silicone composition, which comprises:
   material containers comprising silicone composition subcomponents;
   a separate pump for each silicone composition subcomponent, the pumps being configured to pump the subcomponents of the silicone composition to be manufactured to a mixer through output pipes, wherein the manufacturing arrangement for the silicone composition further comprises a cooling element configured to be closed around the mixer and an output pipe during a production break, the cooling element being configured to:
      cool the mixer for a duration of a downtime to a temperature at least below +3° C., in which temperature a chemical reaction between different subcomponents of the silicone composition in the mixer stops; and
      keep the mixer filled with the subcomponents at the cooling temperature for duration of the downtime; and
      heat the mixer after the downtime to a temperature of the manufacture of the silicone composition without cleaning the mixer,
   and wherein the manufacturing arrangement is configured to start pumping of subcomponents of the silicone composition to the mixer when the manufacturing temperature of the silicone composition has been reached for transferring heated silicone composition from the uncleaned mixer to an application.

9. The manufacturing arrangement for a silicone composition according to claim 8, wherein
   connections of the mixer both to output pipes of the pumps and an output pipe of the mixer are quick fasteners;
   the mixer is configured to be removed from the quick fasteners for the duration of the downtime; and wherein
   the mixer removed from the manufacturing arrangement for a silicone composition is configured to be connected to the manufacturing arrangement after the downtime.

10. The manufacturing arrangement for a silicone composition according to claim 8 wherein the cooling element is a freezer.

11. The manufacturing arrangement for a silicone composition according to claim 10, wherein the silicone composition mixer is configured to be cooled at least to a temperature of −10° C.

12. The manufacturing arrangement for a silicone composition according to claim 8, wherein the cooling element is a refrigerator.

* * * * *